(12) United States Patent
Toohey et al.

(10) Patent No.: US 12,413,401 B2
(45) Date of Patent: Sep. 9, 2025

(54) SYSTEMS AND METHODS FOR EXFILTRATING AN INDICATION OF A QUERY RELATED TO A COMPUTING RESOURCE

(71) Applicant: Wells Fargo Bank, N.A., San Francisco, CA (US)

(72) Inventors: Richard Toohey, Burlington, VT (US); Bradford A. Shea, Mint Hill, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 53 days.

(21) Appl. No.: 18/543,656

(22) Filed: Dec. 18, 2023

(65) Prior Publication Data

US 2025/0202686 A1    Jun. 19, 2025

(51) Int. Cl.
*H04L 9/08*    (2006.01)

(52) U.S. Cl.
CPC .................... *H04L 9/0852* (2013.01)

(58) Field of Classification Search
CPC .................................................... H04L 9/0852
See application file for complete search history.

(56) References Cited

U.S. PATENT DOCUMENTS

| | | | | |
|---|---|---|---|---|
| 9,071,425 | B2 * | 6/2015 | Yuan | H04B 10/70 |
| 2017/0099139 | A1 * | 4/2017 | Han | H04L 9/0858 |
| 2024/0204996 | A1 * | 6/2024 | Shea | H04L 9/0897 |

OTHER PUBLICATIONS

Li, Chun-Yan, et al., "Secure quantum key distribution network with Bell states and local unitary operations"; Chinese Phys. Lett., vol. 22, p. 1049-1052, May 12, 2007.
Deville, Yannick, et al., "Statistical intrusion detection and eavesdropping in quantum channels with coupling: Multiple-preparation and single-preparation methods", Quantum Information Processing, vol. 21, issue 3, Article: 94, Mar. 2022, 17 pages.
Hong-Mei, Huang; "Quantum secure direct communication protocol based on cluster entangled state", 2015 10th International Conference on P2P, Parallel, Grid, Cloud and Internet Computing, Nov. 6, 2015, 4 pages.

* cited by examiner

*Primary Examiner* — Baotran N To
(74) *Attorney, Agent, or Firm* — K&L Gates LLP (57) ABSTRACT

Systems, apparatuses, methods, and computer program products are disclosed for exfiltrating an indication of a query related to a computing resource. An example method includes transmitting, by quantum generator circuitry of a transmitter device at a first time, a stream of quantum particles to a second location and monitoring, by embedded access detection circuitry of a first computing device at a second time after the first time, the computing resource for the query. The example method further includes, in an instance in which the query relating to the computing resource is detected, causing, by quantum noise generator circuitry, a microscopic change in a condition of the transmission of the stream of quantum particles, wherein the microscopic change results in a change in an error rate derived from a detection of the stream of quantum particles at the second location.

20 Claims, 8 Drawing Sheets

SYSTEMS AND METHODS FOR EXFILTRATING AN INDICATION OF A QUERY RELATED TO A COMPUTING RESOURCE

BACKGROUND

Quantum key distribution (QKD) establishes a shared symmetric key between two communicating parties. QKD protocols rely upon quantum mechanics to mitigate the risk of a man-in-the-middle attack, during which a third party eavesdrops on a transmission between parties to duplicate the shared key. Some QKD protocols (e.g., E91) use quantum entangled particles (photons) while others (e.g., BB84) use non-entangled particles (photons) but both use quantum measurement (e.g. photon polarization). An eavesdropper affects the transmission such that the receivers get different results. Results are verified typically using a second classical communications channel.

BRIEF SUMMARY

Modern communication systems may be highly distributed, increasing the need for secure device authentication during the exchange of sensitive data. One challenge facing administrators of secure networks is the gathering of threat intelligence on potential attackers. While attempted intrusions into a secure network may be analyzed after the fact, a better approach is to learn in advance of a real attack by redirecting an attack to a false target, known as a honeypot. Details about the methods and style of the attack may be learned during and after the attack on the honeypot, which may be used to improve network security for actual targets. Honeypots may operate in virtual environments, or may be actual hardware, and may operate in production or specialized testing environments.

One traditional limitation of network security honeypots is the ability of attackers to distinguish fake targets from real targets. As attacks have increased in sophistication, so has the ability of attackers to detect honeypots and avoid revealing valuable intelligence about their methods. In particular, the honeypot must exfiltrate information regarding the attack, at minimum including the fact that an attack has occurred, to be useful to the administrator of a network. The exfiltration of attack information may provide a signal to the attacker that a honeypot incursion has occurred, and the attacker's target is not genuine.

In contrast to conventional techniques for exfiltration of attack information from a honeypot, example embodiments described herein make use of principles of quantum mechanics to provide an indication of access to a honeypot device. Example embodiments build upon and extend notions of quantum key distribution (QKD) and/or Bell experiments. One method of QKD used to securely authenticate devices within a distributed system involves distribution of particles via transmission mediums (e.g., fiber optics, etc.) to a desired recipient (e.g., a device to be authenticated). Such authentication using entangled or non-entangled particles allows for improved communication security between devices by preventing intercepted sensitive data from being accessible to unintended recipients. In a standard QKD scenario, a determination that an eavesdropper has intercepted communications may be made by comparing coincidence rates or other measurements using the sending and receiving devices.

In contrast to standard QKD, example embodiments disclosed herein invert the usual operating procedure and direct an attacker at a honeypot device to intentionally cause an eavesdropping interaction that affects the distribution of particles between the honeypot device (e.g., source) and a separate destination device. Upon measuring coincidence rates at the destination device, a network administrator may make a determination that an attempt to access the source device (e.g., the honeypot) has been made, without any change in operation of the honeypot device itself.

In one example embodiment, a transmitter device at a first location may transmit a continuous stream of quantum particles to a second location. This continuous stream of quantum particles is then used to detect an access event or query pertaining to the computing resource. Upon detecting the access event, a microscopic change may be caused in the transmission of the stream of quantum particles, and the microscopic change may result in a change in the error rate derived from a detection of the stream of quantum particles at the second location.

In another example embodiment, a device at a location may receive a stream of quantum particles. An error rate may be computed based on detecting the stream of quantum particles, and the error rate may be compared to a base error rate. If the error rate is determined to be anomalous based on the comparison to the baseline error rate, an unauthorized access event of a computing resource may be recorded.

In another example embodiment, a stream of quantum particles may be transmitted, and the stream of quantum particles may be physically proximate to a computing resource such as a honeypot storage device, and the computing resource and/or honeypot storage device may store a payload file. The stream of quantum particles may be detected and an error rate may be computed. The computed error rate may be compared to a baseline error rate, and if the error rate is determined to be anomalous based on a comparison to a baseline error rate, an unauthorized access event related to the payload file may be recorded.

Accordingly, the present disclosure sets forth systems, methods, and apparatuses that enable exfiltration of an indication of detecting a network intrusion without alerting an intruder. There are many advantages of these and other embodiments described herein. For instance, embodiments may surreptitiously monitor access to production resources to discover attack patterns. For example, networks may use example embodiments deployed in production systems that are configured to detect anomalous access, thus avoiding the need to use discoverable channels to report an incidence of an attack or intrusion.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
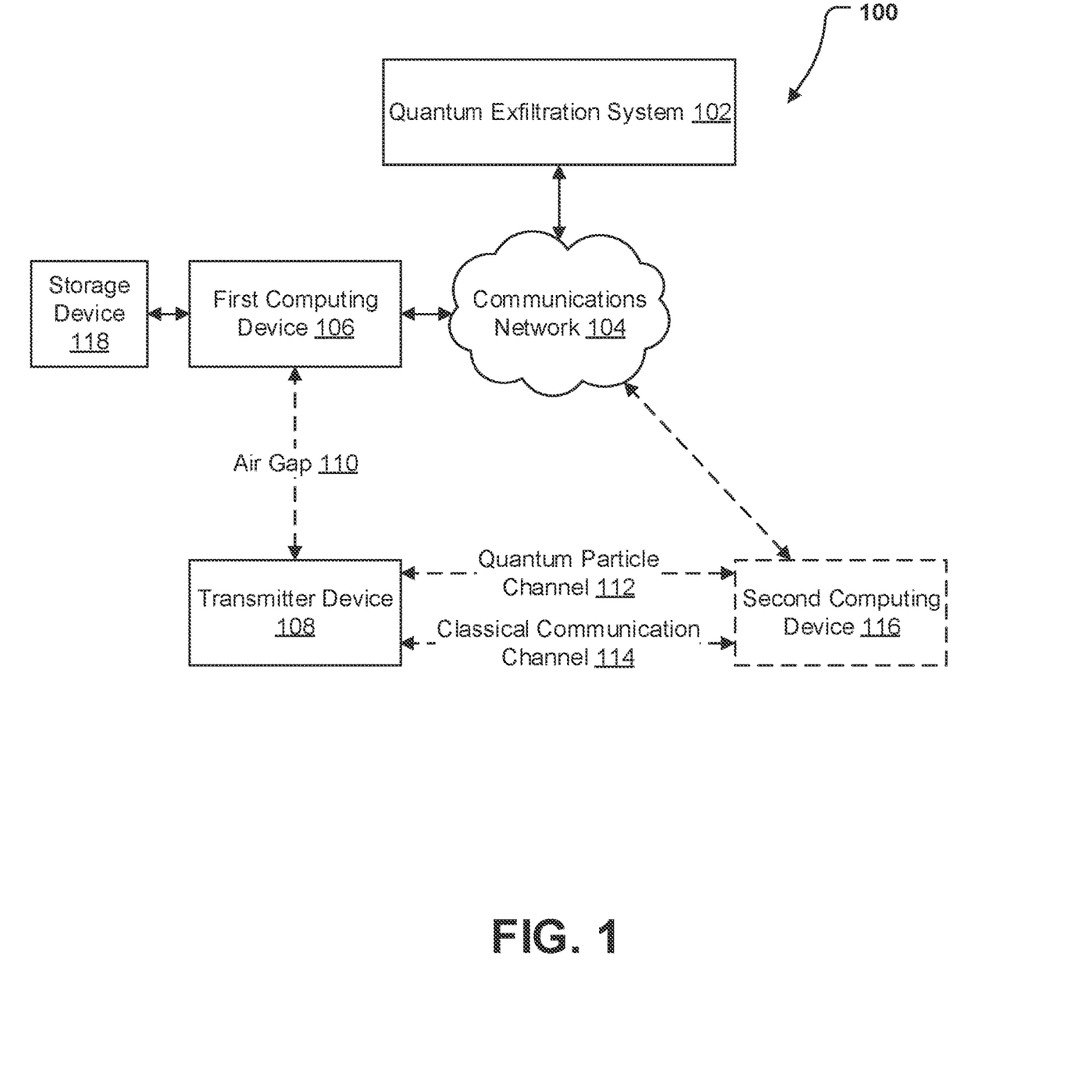
FIG. 1 illustrates a system in which some example embodiments may be used for exfiltrating an indication of a query related to a computing resource.

Example embodiments described herein may be implemented using any of a variety of computing devices or servers. To this end, FIG. 1 illustrates an example environment 100 within which various embodiments may operate. As illustrated, a quantum exfiltration system 102 may receive and/or transmit information via communications network 104 (e.g., the Internet) with any number of other devices, such as one or more of first computing device 106, transmitter device 108, and/or second computing device 116. As illustrated, a transmitter device and a second computing device may also communicate via a quantum particle channel 112 and/or a classical communication channel 114. In some embodiments, the first computing device 106 and the transmitter device 108 may be separated by an air gap 110.

The quantum exfiltration system 102 may be implemented as one or more computing devices or servers, which may be composed of a series of components. Particular components of the quantum exfiltration system 102 are described in greater detail below with reference to apparatus 200 in connection with FIG. 2. In some embodiments, components of the quantum exfiltration system 102 may be physically located, housed, or otherwise embodied in the same device as one of the first computing device 106, the transmitter device 108, and/or the second computing device 116.

In some embodiments, the quantum exfiltration system 102 further includes a storage device 118 that comprises a distinct component from other components of the quantum exfiltration system 102. Storage device 118 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Storage device 118 may host a payload file and/or certain software instructions necessary for the execution of operation of the quantum exfiltration system 102. Storage device 118 may store honeypot payload files that may be used by the quantum exfiltration system 102, or the like. In addition, storage device 118 may store control signals, device characteristics, and access credentials enabling interaction between the quantum exfiltration system 102 and a first computing device 106. In some embodiments, the storage device 118, together with the first computing device 106, may be separated from transmitter device 108 and/or other elements of FIG. 1 by an air gap 110.

The first computing device 106 and second computing device 116 may be embodied by any computing devices known in the art. The first computing device 106 and second computing device 116 need not themselves be independent devices, but may be peripheral devices communicatively coupled to other computing devices.

The transmitter device 108 may be configured to generate and transmit a stream of quantum particles (e.g., quantum particle channel 112) and provide a classical channel for the transmission of control data, a quantum particle basis, results of measurements, and/or the like (e.g., classical communication channel 114). In some embodiments, the transmitter device 108 may be separated from the first computing device 106 by an air gap 110, although in some embodiments, the transmitter device 108 may be embodied as attached circuitry of the first computing device 106. The quantum particle channel 112 and the classical communication channel 114 may connect the second computing device 116 to the transmitter device 108. In some embodiments, the second computing device 116 may be additionally be in communication with the communications network 104, although in some embodiments the second computing device 116 may be isolated from the communications network 104.

Example Implementing Apparatuses

Figure 2:
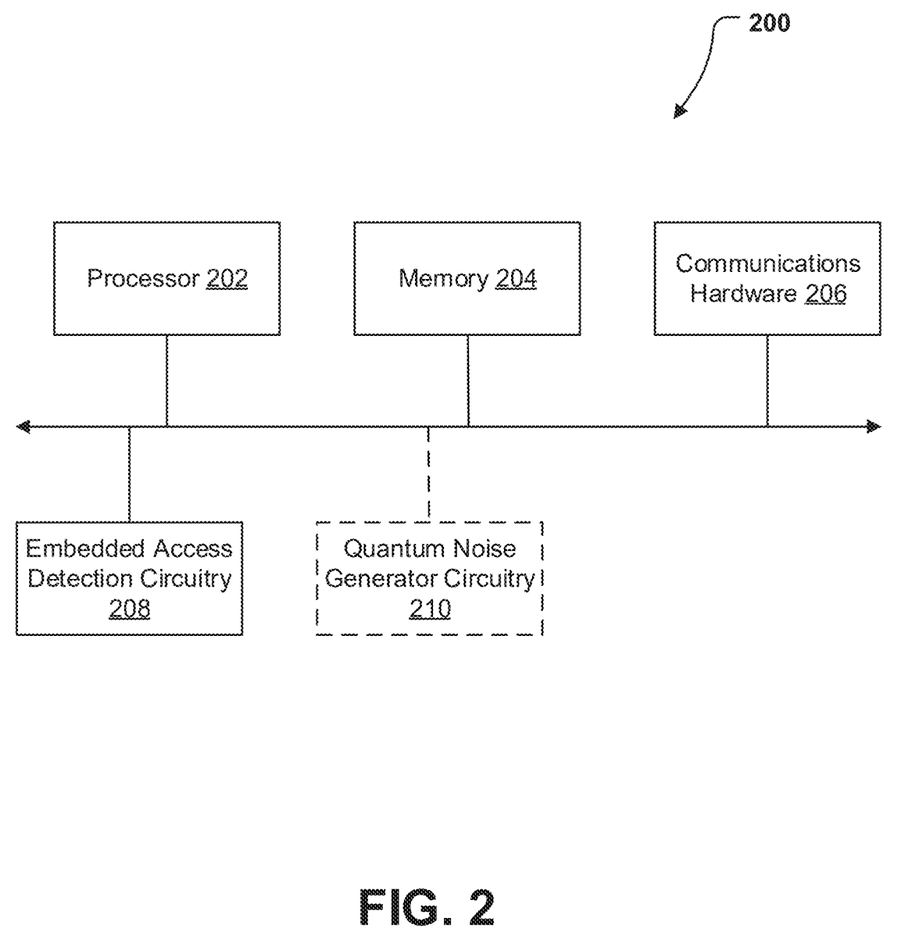
FIG. 2 illustrates a schematic block diagram of example circuitry embodying a first computing device that may perform various operations in accordance with some example embodiments described herein.

The quantum exfiltration system 102 (described previously with reference to FIG. 1), and/or the first computing device 106 may be embodied by one or more computing devices or servers, shown as apparatus 200 in FIG. 2. The apparatus 200 may be configured to execute various operations described above in connection with FIG. 1 and below in connection with FIGS. 5-7. As illustrated in FIG. 2, the apparatus 200 may include processor 202, memory 204, communications hardware 206, embedded access detection circuitry 208, and quantum noise generator circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an embedded access detection circuitry 208 that monitors a computing device for a query. In some embodiments, the embedded access detection circuitry 208 may utilize processor 202, memory 204, or any other hardware component included in the apparatus 200 to perform these operations, as described in connection with FIGS. 5-7 below. In some embodiments, the embedded access detection circuitry 208 may be explicitly disconnected from other circuitry of the apparatus 200 (e.g., disconnected from one or more, or from all other circuitry) and configured so that cross-talk or signals from embedded access detection circuitry 208 are not communicated to certain circuitry of the apparatus 200. In some embodiments, the embedded access detection circuitry 208 may further utilize communications hardware 206 to transmit and/or gather data to or from a variety of sources (e.g., first computing device 106 or storage device 118, as shown in FIG. 1), and/or exchange data with a user, and in some embodiments may utilize processor 202 and/or memory 204 to detect access events and/or queries.

In addition, the apparatus 200 may further comprise a quantum noise generator circuitry 210 that causes a microscopic change in the condition of transmitting a stream of quantum particles. The quantum noise generator circuitry 210 may utilize processor 202, memory 204, or any other hardware component included in the apparatus 200 to perform these operations, as described in connection with FIGS. 5-7 below. In some embodiments, the quantum noise generator circuitry 210 may be explicitly disconnected from other circuitry of the apparatus 200 (e.g., disconnected from one or more, or from all other circuitry) and configured so that cross-talk or signals from quantum noise generator circuitry 210 are not communicated to certain circuitry of the apparatus 200 The quantum noise generator circuitry 210 may further utilize communications hardware 206 to gather data from a variety of sources and/or exchange data with a user, and in some embodiments may utilize processor 202 and/or memory 204 to create microscopic changes in quantum states.

In some embodiments, the quantum noise generator circuitry 210 may be embodied by other components of the apparatus 200. In some embodiments, the other components of apparatus 200 embodying the quantum noise generator circuitry 210 may have special configurations for the generation of quantum noise. For example, the quantum noise generator circuitry 210 may be embodied by a storage device (e.g., a hard disk), where the storage device is configured to generate quantum noise by disturbing the path of the stream of quantum particles physically proximate to various physical components (e.g., motors, electromagnets, capacitors, or the like) of the storage device. In some embodiments, the storage device may further include a computing resource that is monitored for access attempts, in other words, the storage device may itself be a honeypot device.

Although components 202-210 are described in part using functional language, it will be understood that the particular implementations necessarily include the use of particular hardware. It should also be understood that certain of these components 202-210 may include similar or common hardware. For example, the embedded access detection circuitry 208 and quantum noise generator circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the terms "circuitry" should be understood broadly to include hardware, in some embodiments, the terms "circuitry" may in addition refer to software instructions that configure the hardware components of the apparatus 200 to perform the various functions described herein.

Although the embedded access detection circuitry 208 and quantum noise generator circuitry 210 may leverage processor 202, memory 204, or communications hardware 206 as described above, it will be understood that any of embedded access detection circuitry 208 and quantum noise generator circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that embedded access detection circuitry 208 and quantum noise generator circuitry 210 comprise particular machinery designed for performing the functions described herein in connection with such elements of apparatus 200. In some embodiments, the quantum noise generator circuitry 210 may be a component of the first computing device 106.

Figure 3:
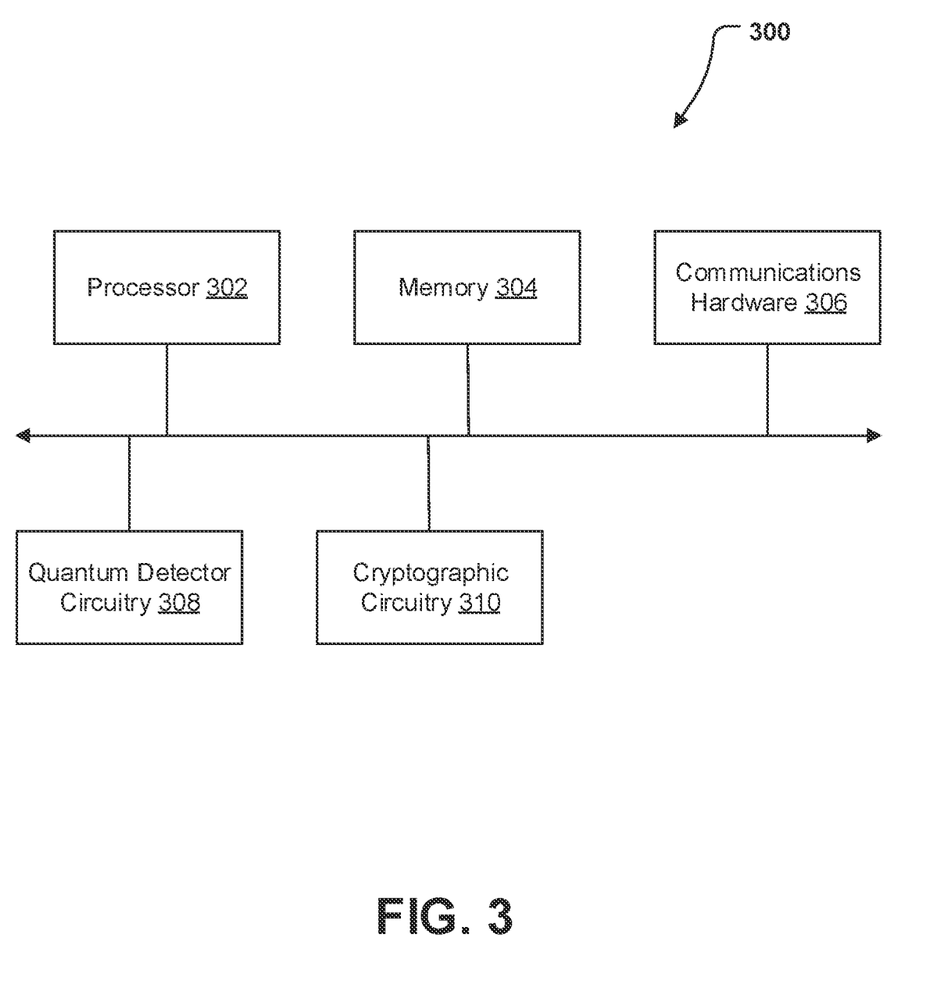
FIG. 3 illustrates a schematic block diagram of example circuitry embodying a second computing device that may perform various operations in accordance with some example embodiments described herein.

As illustrated in FIG. 3, an apparatus 300 is shown that represents an example second computing device 116. The apparatus 300 includes processor 302, memory 304, and communications hardware 306, each of which is configured to be similar to the similarly named components described above in connection with FIG. 2. However, the apparatus 300 also includes quantum detector circuitry 308, which includes hardware components designed for detecting and performing a measurement of a stream of quantum particles. The quantum detector circuitry 308 may utilize processor 302, memory 304, or any other hardware component included in the apparatus 300 to perform these operations, as described in connection with FIGS. 5-7 below. The quantum detector circuitry 308 may further utilize communications hardware 306 to communicate information regarding the detection of quantum particles, or may otherwise utilize processor 302 and/or memory 304 to receive and detect the stream of quantum particles.

The apparatus 300 also includes cryptographic circuitry 310, which includes hardware components designed for computing an error rate based on receiving a stream of quantum particles and a configuration of a quantum generator circuitry. The cryptographic circuitry 310 may utilize processor 302, memory 304, or any other hardware component included in the apparatus 300 to perform these operations, as described in connection with FIGS. 5-7 below. The cryptographic circuitry 310 may further utilize communications hardware 306 to receive cryptographic or configuration information, or may otherwise utilize processor 302 and/or memory 304 to compute an error rate.

Figure 4:
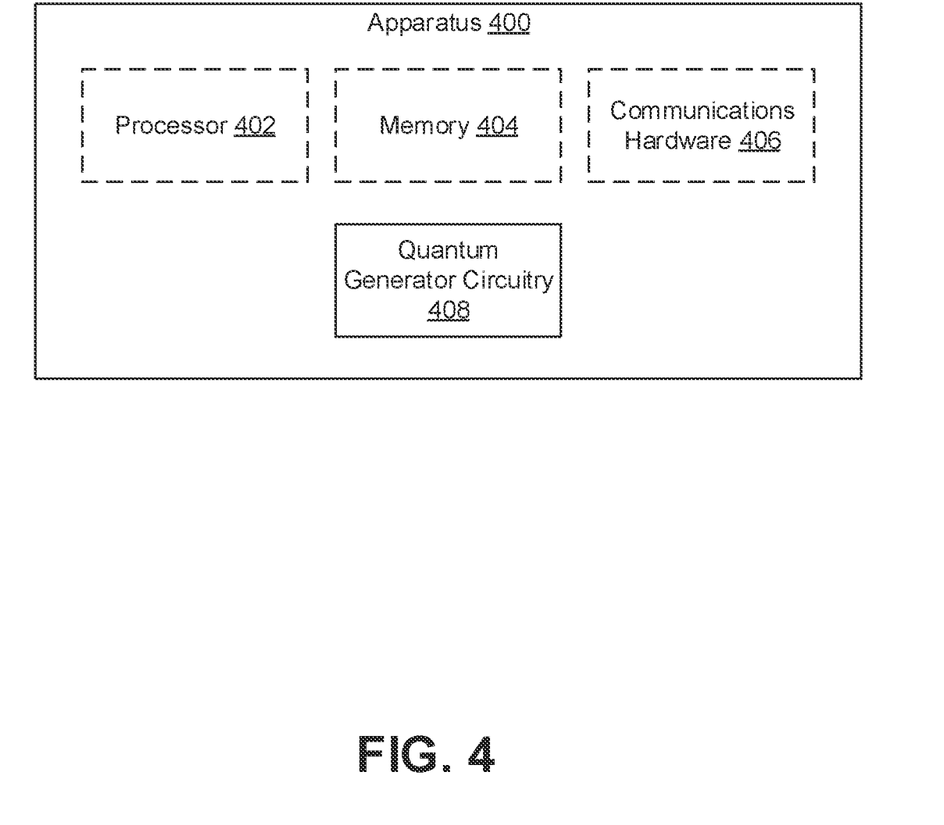
FIG. 4 illustrates a schematic block diagram of example circuitry embodying a transmitter device that may perform various operations in accordance with some example embodiments described herein.

As illustrated in FIG. 4, an apparatus 400 is shown that represents an example transmitter device 108. In some embodiments, the apparatus 400 may include processor 402, memory 404, and communications hardware 406, each of which is configured to be similar to the similarly named components described above in connection with FIG. 2. However, the apparatus 400 also includes quantum generator circuitry 408, which includes hardware components designed for generating a stream of quantum particles which may be entangled or non-entangled. The quantum generator circuitry 408 may utilize processor 402, memory 404, or any other hardware component included in the apparatus 300 to perform these operations, as described in connection with FIGS. 5-7 below. The quantum generator circuitry 408 may further utilize communications hardware 406 to receive or transmit configuration information, such as a quantum basis for particle generation, or may otherwise utilize processor 402 and/or memory 404 to generate the stream of quantum particles.

In some embodiments, various components of the apparatuses 200, 300, and 400 may be hosted remotely (e.g., by one or more cloud servers) and thus need not physically reside on the corresponding apparatus 200, 300, or 400. For instance, some components of the apparatus 200 may not be physically proximate to the other components of apparatus 200. Similarly, some of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200, 300, or 400. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, apparatus 300 as described in FIG. 3, or apparatus 400 as described in FIG. 4, that loading the software instructions onto a computing device or apparatus produces a special-purpose machine comprising the means for implementing various functions described herein.

Having described specific components of example apparatuses 200, 300, and 400, example embodiments are described below in connection with a series of flowcharts.

Example Operations

Figure 5:
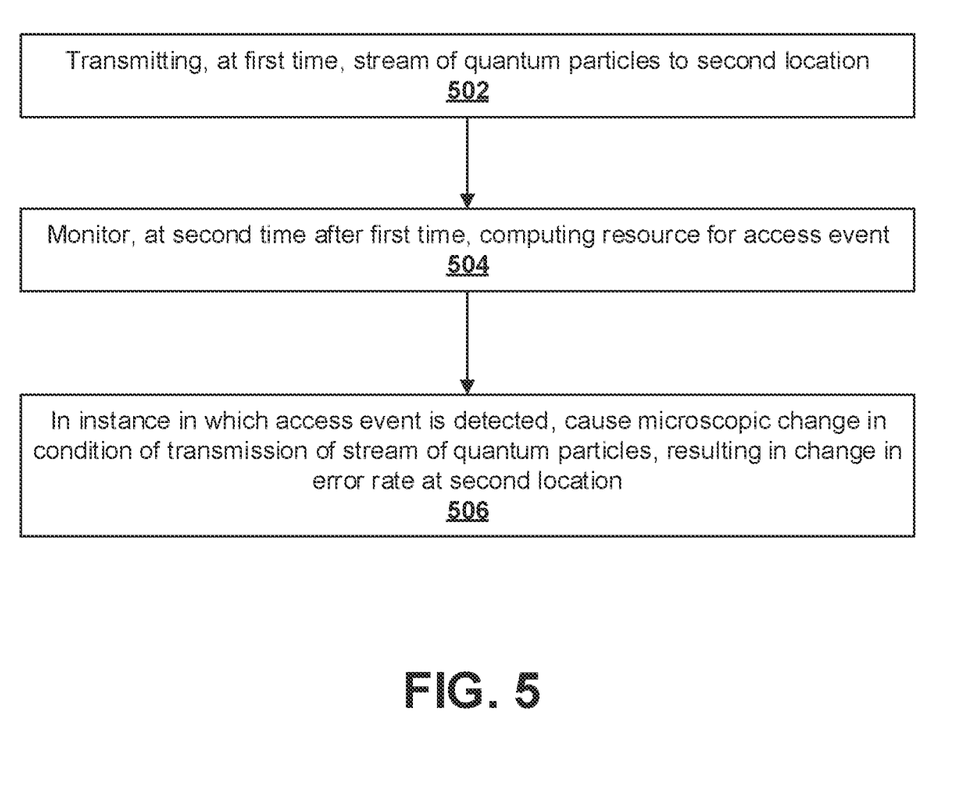
FIG. 5 illustrates an example flowchart for exfiltrating an indication of a query related to a computing resource, in accordance with some example embodiments described herein.
Figure 6:
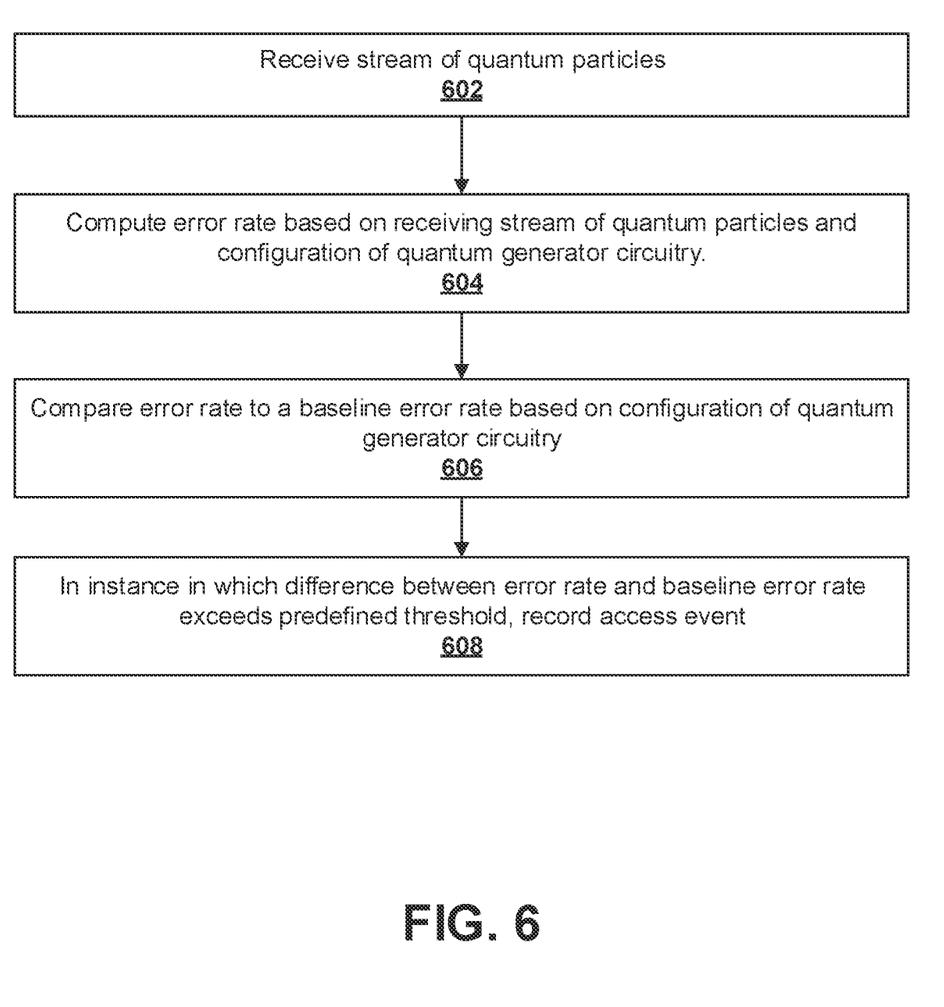
FIG. 6 illustrates an example flowchart for determining that a query related to a computing resource has occurred, in accordance with some example embodiments described herein.
Figure 7:
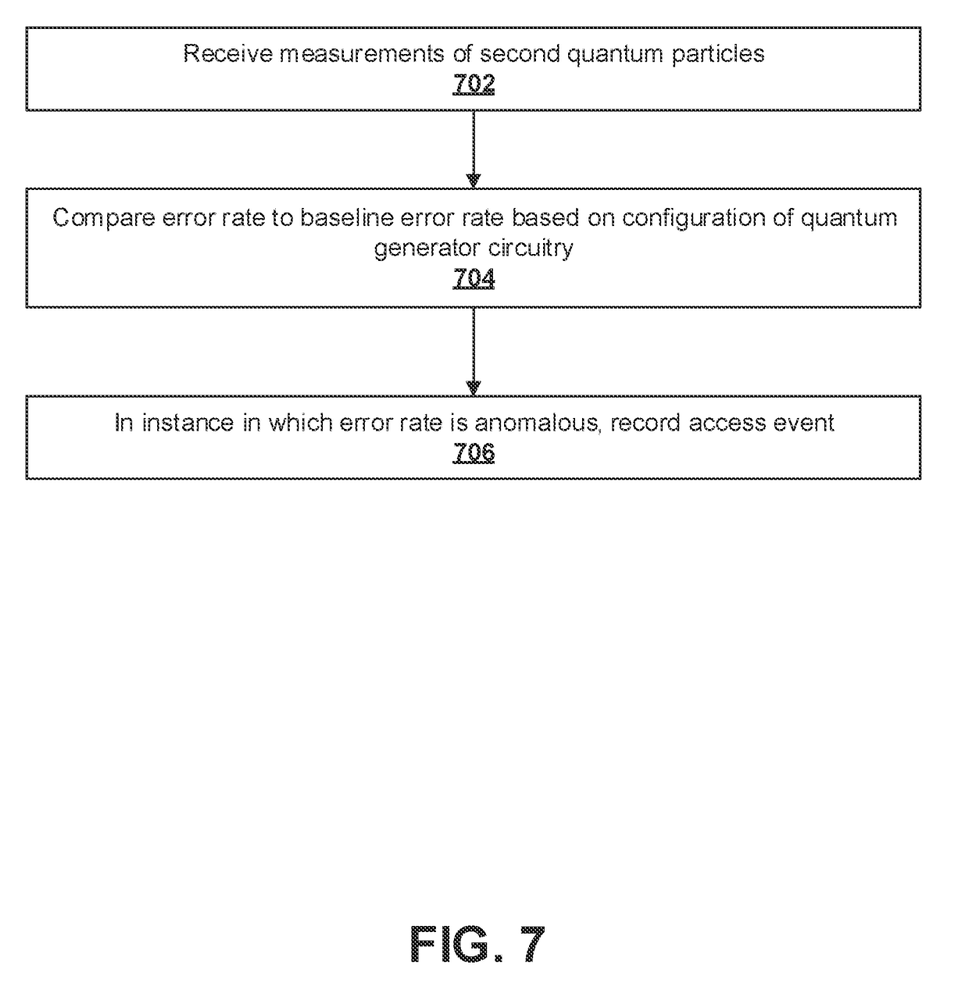
FIG. 7 illustrates another example flowchart for providing a set of measurements of quantum particles to determine a query, in accordance with some example embodiments described herein.

Turning to FIGS. 5-7, example flowcharts are illustrated that contain example operations implemented by example embodiments described herein. The operations illustrated in FIG. 5 may, for example, be performed by the quantum exfiltration system 102 shown in FIG. 1, which may in turn be embodied by an apparatus 200, which is shown and described in connection with FIG. 2 (and/or a transmitter device 108 shown and described in connection with FIG. 4). To perform the operations described below, the apparatus 200 may utilize one or more of processor 202, memory 204, communications hardware 206, embedded access detection circuitry 208, quantum noise generator circuitry 210 (and/or similar circuitry of an apparatus 400), and/or any combination thereof. It will be understood that user interaction with the quantum exfiltration system 102 may occur directly via communications hardware 206, or may instead be facilitated by a separate computing device, (e.g., first computing device 106 as shown in FIG. 1, or other computing devices not pictured), and which may have similar or equivalent physical componentry facilitating such user interaction.

Meanwhile, the various operations described in connection with FIGS. 6 and 7 may be performed by apparatus 300, which may utilize one or more of processor 302, memory 304, communications hardware 306, quantum detector circuitry 308, cryptographic circuitry 310, and/or any combination thereof.

Turning first to FIG. 5, example operations are shown for exfiltrating an indication of a query related to a computing resource. As shown by operation 502, the apparatus 200 and/or apparatus 400 include means, such as communications hardware 206, communications hardware 406, quantum generator circuitry 408, or the like, for initiating transmission of, or transmitting, at a first time, a stream of quantum particles to a second location. The quantum generator circuitry 408 may prepare a set of quantum particles to prepare for transmitting the quantum particle stream to the second location. For example, the quantum generator circuitry 408 may prepare polarized photons in a known quantum state which may be directed to travel to the second location. In some embodiments, the apparatus 200 may use the communications hardware 206 to indicate to or cause the quantum generator circuitry 408 of the apparatus 400 to transmit the stream of quantum particles. In some embodiments the communications hardware 406 of the apparatus 400 may receive the indication to cause the quantum generator circuitry 408 to transmit or initiate transmission of the stream of quantum particles. In some embodiments, the apparatus 200 may directly cause the quantum generator circuitry 408 to transmit the stream of quantum particles, or may use the apparatus 400 to cause the transmission indirectly.

The quantum generator circuitry 408 may use any particles to prepare the stream of quantum particles, provided the particles may be prepared in a particular quantum state and that the particles may be detected and measured at another location. In some embodiments, the stream of quantum particles may be non-entangled, for example, as in the BB84 QKD protocol. In some embodiments, particles may be generated in a pre-determined, (e.g., non-random) basis, and the pre-determined basis may be shared with a device at another location. In some embodiments, non-entangled particles may be generated in a particular basis, and the basis may be selected randomly (e.g., using cryptographically-safe random number generation), and information related to the basis used for generating the particle may be transmitted to another computing device (as described in some example operations below). In some embodiments, entangled particles may be generated, for example, as in the E91 QKD protocol. Entangled particles may be generated entangled with a second set of particles, such that each particle from the stream of quantum particles transmitted to the second location is entangled with a particle from the second set of particles.

The quantum particles may be transmitted using attached hardware of an apparatus 200 embodying a first computing device 106 or a transmitter device 108. In some embodiments, a separate transmitter device 108 embodied by an apparatus 400 may include the quantum generator circuitry 408 and may be distinct from the first computing device 106 and/or the apparatus 200.

As shown by operation 504, the apparatus 200 includes means, such as processor 202, memory 204, communications hardware 206, embedded access detection circuitry 208, or the like, for monitoring, at a second time after the first time, the computing resource for the access event. In some embodiments, the embedded access detection circuitry 208 may monitor circuitry of the first computing device 106, which may be embodied by an apparatus 200, for an accessing event related to the computing resources. In some embodiments, the embedded access detection circuitry 208 may monitor a computing resource that is remote, not physically proximate to the apparatus 200, or may belong to a different computing device.

In some embodiments, the embedded access detection circuitry 208 may include measures to make it difficult for a potential attacker to observe the monitoring of the computing resource. For example, the embedded access detection circuitry 208 may use embedded bytecode, hardware or firmware embedded circuitry, processes and/or circuitry disguised to appear as other processes or circuitry intended for normal purposes, and/or the like. In some embodiments, the embedded access detection circuitry 208 may use the processor 202 and/or memory 204 to monitor activity related to the computing resource. In embodiments in which the processor 202 and/or memory 204 are components of the computing resource, the embedded access detection circuitry 208 may comprise separate circuitry not directly interfaced with the processor 202 and/or memory 204, but configured and positioned as to detect certain activities of the processor 202 and/or memory 204.

In some embodiments, the embedded access detection circuitry 208 may not be a separate component of the apparatus 200, but may be embodied as a particular configuration of the components of the apparatus 200 (e.g., processor 202, memory 204, communications hardware 206) such that access to the computing resource may trigger a particular response that may be exploited or sensed by quantum noise generator circuitry 210. For example, access of a particular file comprising the computing resource may activate certain circuitry of a memory 204 (e.g., embodied as a physical hard disk) in a way that may be detectable by a quantum noise generator circuitry 210, or may in some embodiments directly cause a microscopic change in a condition of the transmission of the stream of quantum particles.

Finally, as shown by operation 506, the apparatus 200 includes means, such as processor 202, quantum noise generator circuitry 210, or the like, for in an instance in which the access event relating to the computing resource is detected, causing a microscopic change in a condition of the transmission of the stream of quantum particles. The microscopic change may result in a change in an error rate derived from a detection of the stream of quantum particles at the second location. The quantum noise generator circuitry 210 may cause a microscopic change that is difficult to detect by a potential attacker or intruder. For example, the quantum noise generator circuitry 210 may use dedicated components for changing microscopic conditions, or the quantum noise generator circuitry 210 may cause other components or circuitry of the apparatus 200 (or other devices, such as apparatus 400) to operate in conditions slightly different from nominal operation to cause a microscopic change.

In some embodiments, the microscopic change in the condition of the transmission of the stream of particles is a temperature change. For example, the quantum noise generator circuitry 210 may cause a small change in voltage of various electronic components which in turn may change the ambient temperature around the transmitted stream of quantum particles, perturbing the quantum state of the stream of quantum particles. By perturbing the quantum state of the stream of quantum particles, the error rate, coincidence, rate, and/or other measurements of the stream of quantum particles may be perturbed, indicating that an eavesdropper has intercepted the stream of quantum particles. In some embodiments, the quantum noise generator circuitry 210 may cause other perturbations that alter the quantum state of the stream of quantum particles, such as adjusting the spatial position of the transmitter, adjusting conditions or settings of components of components of the quantum generator circuitry 408, applying electric and/or magnetic fields near the stream of quantum particles, scattering, absorbing, re-emitting the quantum particles, and/or the like.

In some embodiments, the stream of quantum particles may be entangled with a set of second quantum particles. The microscopic change in the condition of the transmission of the stream of quantum particles may cause a disruption of the entanglement between the stream of quantum particles and the set of second quantum particles. As described previously, the stream of quantum particles may be non-entangled (e.g., for a BB84 protocol) or entangled (e.g., for an E91 protocol). In some embodiments, the set of second quantum particles may further be measured with respect to randomly determined basis (e.g., as in the E91 protocol), where the basis choice may be transmitted (e.g., by classical communication channel 114) to a second computing device 116 to determine an error rate or test statistic based on the measurements of the entangled particles.

In some embodiments, the quantum exfiltration system 102 may receive the measurements related to the stream of quantum particles from the second computing device 116 and/or measurements of a second set of quantum particles (e.g., particles entangled with the stream of quantum particles) from the first computing device 106. The quantum exfiltration system 102 may process the quantum particle measurements according to parameters of a Bell test experiment, BB84 protocol, E91 protocol, or other relevant frameworks to determine if an eavesdropper or other source has cause a perturbation of the stream of quantum particles (e.g., embodied by the quantum particle channel 112).

Turning next to FIG. 6, example operations are shown for determining that an access event related to a computing resource has occurred. As shown by operation 602, the apparatus 300 includes means, such as processor 302, memory 304, communications hardware 306, quantum detector circuitry 308, or the like, for receiving the stream of quantum particles. The quantum detector circuitry 308 may be a component of a second computing device 116 or a quantum exfiltration system 102, and may be embodied as an apparatus 300. The quantum detector circuitry 308 may include hardware for the detection and measurement of quantum particles (e.g., photons, electrons) including but not limited to photovoltaic sensors, scintillator detectors, photomultiplier tubes, wire chamber detectors, polarizers, magnetic fields and any other devices known in the art for the detection of quantum particles and measurement of a relevant quantum state with respect to a particular basis. In some embodiments, the basis may be chosen randomly, and a true random number may be generated to determine the measurement basis. In some embodiments, the basis to use for the measurement may be received from an external source via communications hardware 306 or retrieved from memory 304 to be used for the measurement.

In some embodiments, the quantum detector circuitry 308 may cause measurements or detections of the stream of quantum particles to be recorded to memory 304 or external storage located on a separate networked computing device. In some embodiments, the measurements may undergo processing, such as cleaning, normalization, compression, or the like, prior to or subsequent to storing the measurements.

As shown by operation 604, the apparatus 300 includes means, such as processor 302, memory 304, communications hardware 306, cryptographic circuitry 310, or the like, for computing an error rate based on receiving the stream of quantum particles and a configuration of the quantum generator circuitry. The cryptographic circuitry 310 may compute the error rate based on a comparison between the expected measurement and the actual measurement for a given basis and measurement. For example, each received quantum particle may be measured in a chosen basis and recorded, then compared with the generated basis transmitted from a remote device. In an instance in which different bases are used for generation and detection, no correlation may be expected, but correlation may be expected for an instance in which the same basis is chosen for generation and detection. In another example, a measurement basis of an entangled particle may be received from a remote device and compared with the basis used for the measurement. In an instance in which the chosen bases match, the results may be compared and used for the error rate calculation. The error rate may be computed based on the ratio of the number of mismatched measurements to the total number of measurements where correlation is expected.

As shown by operation 606, the apparatus 300 includes means, such as processor 302, memory 304, communications hardware 306, cryptographic circuitry 310, or the like, for comparing the error rate to a baseline error rate. The baseline error rate may be based on the configuration of the quantum generator circuitry. The cryptographic circuitry 310 may compare the error rate, for example as measured in operation 604, to a baseline error rate. The baseline error rate may depend on a number of factors, and may be influenced by privacy amplification, whether the choice of basis factors into the error rate calculation, the degree of entanglement for configurations that use entangled quantum particles, and the like. In some embodiments, the baseline error rate may be determined experimentally for an ideal test configuration with no eavesdropper present.

Finally, as shown by operation 608, the apparatus 300 includes means, such as processor 302, memory 304, communications hardware 306, cryptographic circuitry 310, or the like, for in an instance in which the difference between the error rate and the baseline error rate exceeds a predefined threshold, recording the indication of the access event related to the computing resource. The cryptographic circuitry 310 may record the instance using memory 304 or other storage, and infer based on the difference between the error rate and the baseline error rate that an access event related to the computing resource may have occurred. The predefined threshold may be set prior to operation using communications hardware 306 of the apparatus 300, or a connected external computing device via a communications network (e.g., communications network 104, although in some embodiments the second computing device 116 may be explicitly disconnected from the communications network 104, and may be connected to a different communications network). The recording of the access event may include various details such as the time, the error rate, the related computing resource, details of the quantum measurements, and/or the like.

Turning next to FIG. 7, example operations are shown for providing a set of measurements of quantum particles to determine an access event. As shown by operation 702, the apparatus 400 includes means, such as processor 302, memory 304, communications hardware 306, quantum detector circuitry 308, or the like, for receiving a set of measurements of the set of second quantum particles. Comparing the set of measurements of the set of second quantum particles with a set of measurements of the stream of quantum particles may produce a coincidence rate and/or an error rate. In some embodiments, the stream of quantum particles may be a stream of entangled quantum particles, and the entangled quantum particles may each be entangled with a particle from a second set of particles. The measurement of the second set of particles may be produced by the apparatus 400 or a device where the stream of quantum particles is generated, or in some embodiments the second set of quantum particles may be transmitted to a separate device where the measurement of the second set of particles may be performed. The transmitted measurements may include details regarding the measurement basis and the result of the measurement for the given basis. In some embodiments, the measurements may be performed using hardware for the detection and measurement of quantum particles (e.g., photons, electrons) including but not limited to photovoltaic sensors, scintillator detectors, photomultiplier tubes, wire chamber detectors, polarizers, magnetic fields and any other devices known in the art for the detection of quantum particles and measurement of a relevant quantum state with respect to a particular basis. In some embodiments, the basis may be chosen randomly, and a true random number may be generated to determine the measurement basis. In some embodiments, the basis to use for the measurement may be received from an external source via communications hardware 306 or retrieved from memory 304 to be used for the measurement.

As shown by operation 704, the apparatus 300 includes means, such as processor 302, memory 304, communications hardware 306, cryptographic circuitry 310, or the like, for comparing the error rate (or coincidence rate) to a baseline error rate (or baseline coincidence rate), wherein the baseline error rate (or baseline coincidence rate) is based on the configuration of the quantum generator circuitry. The cryptographic circuitry 310 may compare the error rate, for example as measured in operation 604, to a baseline error rate. The baseline error rate may depend on a number of factors, and may be influenced by privacy amplification, whether the choice of basis factors into the error rate calculation, the degree of entanglement for configurations that use entangled quantum particles, and the like. In some embodiments, the baseline error rate may be determined experimentally for an ideal test configuration with no eavesdropper present.

Finally, as shown by operation 706, the apparatus 300 includes means, such as processor 302, memory 304, communications hardware 306, cryptographic circuitry 310, or the like, for in an instance in which the error rate (or coincidence rate) is anomalous, recording the indication of the access event related to the computing resource. The cryptographic circuitry 310 may record the instance using memory 304 or other storage, and infer based on the difference between the error rate and the baseline error rate that an access event related to the computing resource may have occurred. The predefined threshold may be set prior to operation using communications hardware 306 of the apparatus 300, or a connected external computing device via a communications network (e.g., communications network 104, although in some embodiments the second computing device 116 may be explicitly disconnected from the communications network 104, and may be connected to a different communications network). The recording of the access event may include various details such as the time, the error rate, the related computing resource, details of the quantum measurements, and/or the like.

FIGS. 5-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Interaction

Figure 8:
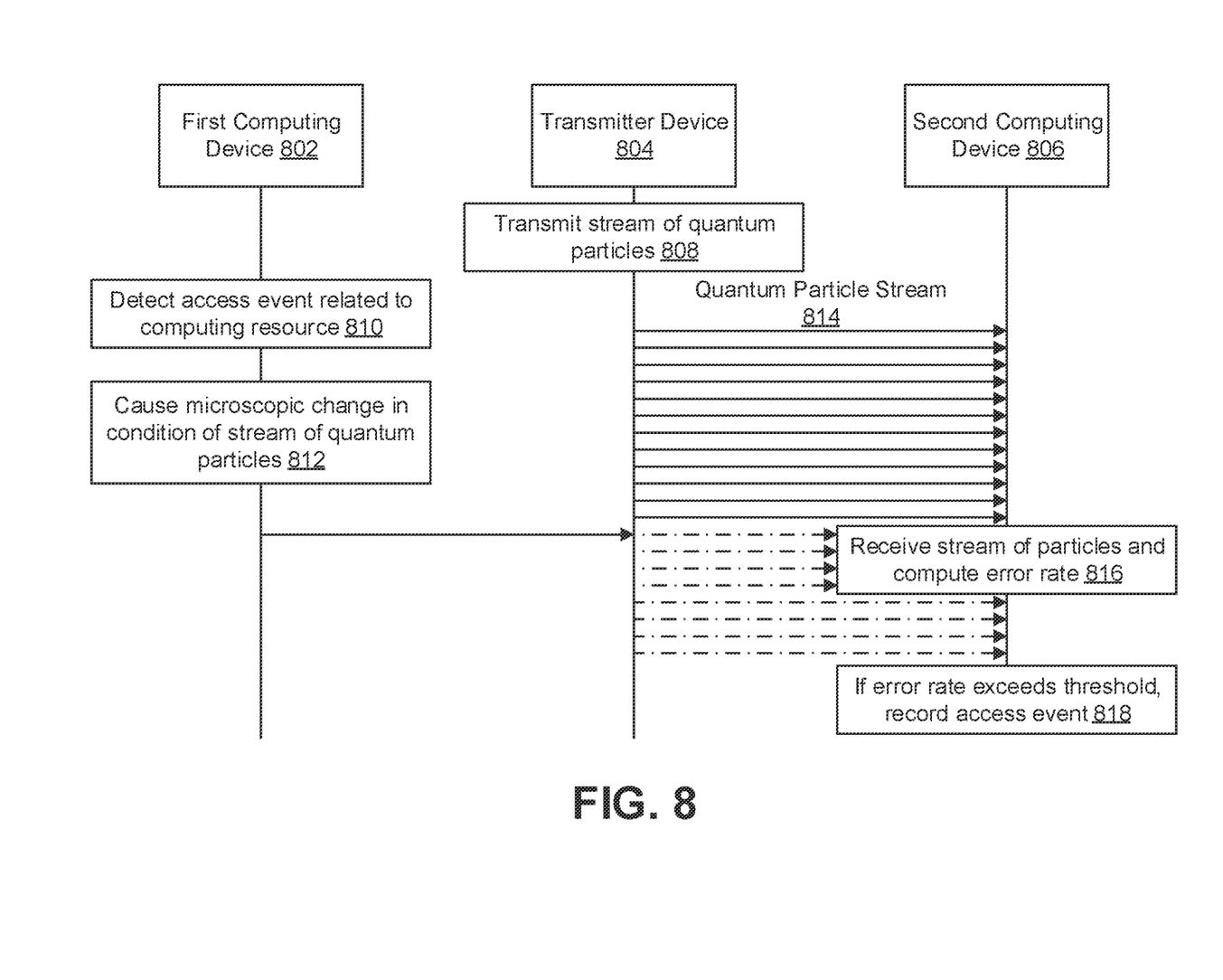
FIG. 8 illustrates a swim lane diagram with example operations that may be performed by components of the environment depicted in FIG. 1, in accordance with some example embodiments described herein.

FIG. 8 shows a swim lane diagram illustrating example operations (e.g., as described above in connection with FIGS. 5-7) performed by components of the environment depicted in FIG. 1 to produce various benefits of the implementations described herein. The operations shown in the swim lane diagram performed by a first computing device (e.g., first computing device 106) are shown along the line extending from the box labeled "first computing device 802," operations performed by a transmitter device (e.g., transmitter device 108) are shown along the line extending from the box labeled "transmitter device 804," and operations performed by second computing device (e.g., second computing device 116) are shown along the line extending from the box labeled "second computing device 806." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 8.

At operation 808, a transmitter device 804 may transmit a stream of quantum particles. At operation 810, a first computing device 802 may detect an access event related to a computing resource. At operation 812, a first computing device may cause a microscopic change in the condition of a stream of quantum particles or quantum particle stream 814 (e.g., as transmitted at operation 808). At operation 816, a second computing device 806 may receive the stream of quantum particles (e.g., quantum particle stream 814) and compute an error rate. At operation 818, the second computing device may, if the error rate exceeds a threshold, record an access event.

In some embodiments, some of the operations described above in connection with FIGS. 5-8 may be modified or further amplified. Furthermore, in some embodiments, additional optional operations may be included. Modifications, amplifications, or additions to the operations above may be performed in any order and in any combination.

CONCLUSION

As described above, example embodiments provide methods and apparatuses that enable improved exfiltration of detection events from computing resources. Example embodiments thus provide tools that overcome the problems faced by creating a honeypot for network security. Moreover, embodiments described herein avoid using conventional signals to exfiltrate the indication that the honeypot has been accessed.

As these examples all illustrate, example embodiments contemplated herein provide technical solutions that solve real-world problems faced during planning and administering a secure computer network. And while network security has been an issue for decades, the recently exploding amount of data made available by recently emerging technology today has made this problem significantly more acute, as the demand for security solutions, including honeypots has grown significantly even while the complexity of defending against network security threats has itself increased. At the same time, the recently arising ubiquity of quantum computing and quantum information technology have unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for exfiltrating an indication of a query related to a computing resource, the method comprising:
    initiating, by quantum generator circuitry of a transmitter device at a first time, transmission of a stream of quantum particles to a second location; and
    at a second time after the first time, while the quantum generator circuitry transmits the stream of quantum particles:
        receiving, by communications hardware of a first computing device, the query related to the computing resource, and
        in response to receiving the query, activating the computing resource by a processor of the first computing device,
        wherein activating the computing resource causes a microscopic change in a condition of the transmission of the stream of quantum particles, wherein the microscopic change results in a change in an error rate derived from a detection of the stream of quantum particles at the second location.

2. The method of claim 1, wherein quantum noise generator circuitry is a component of the first computing device, wherein the quantum noise generator circuitry causes the change in the condition of the transmission of the stream of quantum particles.

3. The method of claim 1, wherein an air gap exists between the quantum generator circuitry and the first computing device.

4. The method of claim 1, wherein a second computing device at the second location is communicatively coupled to the transmitter device.

5. The method of claim 1, further comprising:
    receiving, by quantum detector circuitry of a second computing device, the stream of quantum particles; and
    computing, by cryptographic circuitry of the second computing device, an error rate based on receiving the stream of quantum particles and a configuration of the quantum generator circuitry.

6. The method of claim 5, further comprising:
    comparing, by the cryptographic circuitry of the second computing device, the error rate to a baseline error rate, wherein the baseline error rate is based on the configuration of the quantum generator circuitry; and
    in an instance in which a difference between the error rate and the baseline error rate exceeds a predefined threshold, recording, by the cryptographic circuitry of the second computing device, the indication of the query related to the computing resource.

7. The method of claim 2, wherein the quantum noise generator circuitry is a storage device physically proximate to a path of the stream of quantum particles, wherein the storage device comprises the computing resource.

8. The method of claim 1, wherein the microscopic change in the condition of the transmission of the stream of quantum particles is a temperature change.

9. The method of claim 1, wherein the stream of quantum particles is entangled with a set of second quantum particles, wherein the microscopic change in the condition of the transmission of the stream of quantum particles causes a disruption of entanglement between the stream of quantum particles and the set of second quantum particles.

10. The method of claim 9, further comprising:
receiving, by communications hardware, a set of measurements of the set of second quantum particles, wherein comparing the set of measurements of the set of second quantum particles with a set of measurements of the stream of quantum particles produces an error rate.

11. The method of claim 10, further comprising:
comparing, by cryptographic circuitry of a second computing device, the error rate to a baseline error rate, wherein the baseline error rate is based on a configuration of the quantum generator circuitry; and
in an instance in which the error rate is anomalous, recording, by the cryptographic circuitry of the second computing device, the indication of the query related to the computing resource.

12. A system for exfiltrating an indication of a query related to a computing resource, the system comprising:
a transmitter device with quantum generator circuitry configured to initiate, at a first time, transmission of a stream of quantum particles to a second location; and
a first computing device comprising:
communications hardware configured to, at a second time after the first time and while the quantum generator circuitry transmits the stream of quantum particles, receive the query related to the computing resource; and
a processor configured to, in response to receiving the query, activate the computing resource,
wherein activating the computing resource causes a microscopic change in a condition of the transmission of the stream of quantum particles, wherein the microscopic change results in a change in an error rate derived from a detection of the stream of quantum particles at the second location.

13. The system of claim 12, wherein the first computing device further comprises quantum noise generator circuitry, wherein the quantum noise generator circuitry causes the change in the condition of the transmission of the stream of quantum particles.

14. The system of claim 12, wherein an air gap exists between the quantum generator circuitry and the first computing device.

15. The system of claim 12, wherein a second computing device at the second location is communicatively coupled to the transmitter device.

16. The system of claim 12, further comprising a second computing device comprising:
quantum detector circuitry configured to receive the stream of quantum particles; and
cryptographic circuitry configured to compute an error rate based on receiving the stream of quantum particles and a configuration of the quantum generator circuitry.

17. The system of claim 16, wherein the cryptographic circuitry of the second computing device is further configured to:
compare the error rate to a baseline error rate, wherein the baseline error rate is based on the configuration of the quantum generator circuitry; and
in an instance in which a difference between the error rate and the baseline error rate exceeds a predefined threshold, record the indication of the query related to the computing resource.

18. The system of claim 13, wherein the quantum noise generator circuitry is a storage device physically proximate to a path of the transmitted quantum particle stream, wherein the storage device comprises the computing resource.

19. The system of claim 12, wherein the microscopic change in the condition of the transmission of the stream of quantum particles is a temperature change.

20. An apparatus for exfiltrating an indication of an query related to a computing resource, the apparatus comprising:
means for initiating, at a first time, transmission of a stream of quantum particles to a second location; and
means for, at a second time after the first time, while the stream of quantum particles is transmitted:
receiving the query related to the computing resource, and
in response to receiving the query, activating the computing resource;
wherein activating the computing resource causes a microscopic change in a condition of the transmission of the stream of quantum particles, wherein the microscopic change results in a change in an error rate derived from a detection of the stream of quantum particles at the second location.

* * * * *